United States Patent [19]
Mann et al.

[11] 3,866,196
[45] Feb. 11, 1975

[54] BLOWN FUSE INDICATOR FOR ROTATING EQUIPMENT

[75] Inventors: August C. Mann, Pittsburgh; Thayer L. Dillman, North Versailles, both of Pa.

[73] Assignee: Westinghouse Electric Corporation, Pittsburgh, Pa.

[22] Filed: Aug. 1, 1973

[21] Appl. No.: 384,656

[52] U.S. Cl. ............... 340/250, 337/244, 310/68 D
[51] Int. Cl. ........................................... H01h 85/30
[58] Field of Search ........... 310/68; 317/52; 321/12, 321/14; 337/206, 244; 340/250, 248 E, 253 E, 263, 267, 268, 271

[56] References Cited
UNITED STATES PATENTS

| | | | |
|---|---|---|---|
| 2,581,308 | 1/1952 | Smith | 340/250 X |
| 3,476,979 | 11/1969 | Stumpe et al. | 340/250 X |
| 3,686,523 | 8/1972 | Gorden et al. | 310/68 R |

*Primary Examiner*—John W. Caldwell
*Assistant Examiner*—Daniel Myer
*Attorney, Agent, or Firm*—G. H. Telfer

[57] ABSTRACT

A blown fuse indicator for rotating equipment, such as a rotating rectifier assembly, in which a fuse is mounted on an internal surface of a support wheel where it is not visible during operation. An opening is provided through the support wheel structure in alignment with the fuse, and radially movable indicator element or projectile is provided in the fuse which is normally held against movement but which is released when the fuse blows and permitted to move outward through the opening to a position where it can be observed, as by the use of stroboscopic light. Means are provided in the opening for limiting outward movement of the indicator so that it cannot be thrown out of the equipment.

6 Claims, 3 Drawing Figures

BLOWN FUSE INDICATOR FOR ROTATING EQUIPMENT

BACKGROUND OF THE INVENTION

The present invention relates to blown fuse indicators for rotating equipment, and it relates more particularly to fused rotating rectifier assemblies for use in brushless excitation systems for alternating current generators.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and connected thereto to provide a direct current output. The output of the rectifier is supplied to the field winding of the main generator which also rotates with the exciter armature and rectifier. In this way, an excitation system is provided which requires no commutator or slip rings and no sliding contacts.

In use, such equipment must of course have a high degree of reliability, and the rectifier diodes are provided with individual fuses which will blow and remove a failed diode from the circuit. In exciters for large generators, where a relatively large number of diodes is necessary to carry the current, an excess number of diodes is normally provided so that some predetermined number of diodes can be removed from the circuit without overloading the remaining good diodes. Thus, since failure of a reasonable number of diodes does not affect operation, it is not necessary to shut down an entire large turbine generator unit merely to replace a failed diode in the exciter and operation can continue until the next regularly scheduled shutdown when the diodes can be replaced as necessary. It is desirable, however, to know of the presence of failed diodes and the number of such diodes during operation. For this purpose, the fuses are provided with indicating means of a type which can be observed during rotation by means of stroboscopic light, or otherwise, so that the existence and number of failed diodes can be determined.

Such blown fuse indicators have been generally used and present no special problems where the fuse or fuses are observable during operation. There have been developed more recently, however, rotating rectifier designs using modular rectifier assemblies such as the construction shown in a copending application of A. J. Spisak and T. L. Dillman, Ser. No. 287,923, filed Sept. 11, 1972 and assigned to the Assignee of the present invention. In this construction, the rectifier modules each include two diode assemblies with a fuse at each end of the module. The modules are mounted on the internal cylindrical surface of an axially extending rim of a support wheel so that the fuse at the inner end is not visible from the outside of the wheel during operation. For the reasons discussed above, however, it is necessary to provide some means to indicate when these interior fuses blow which can be observed during rotation of the assembly.

SUMMARY OF THE INVENTION

In accordance with the present invention, a blown fuse indicator is provided for a rotating assembly such as a modular rotating rectifier in which the fuse is not readily observable, and which is particularly useful with the type of modular assembly disclosed in the above-mentioned application.

In such an assembly, the rectifier module is mounted on the interior surface of a cylindrical rim so that the fuse at one end of the module is not readily visible. In accordance with the invention, a blown fuse indicator is provided in the form of a radially movable indicator member or projectile which is normally held against such movement by any suitable means such as a fusible wire. A generally radial opening is provided through the rim on which the fuse is mounted in alignment with the fuse. Upon blowing of the fuse, the wire or other restraining means is ruptured to release the indicator member which moves radially outward under the influence of centrifugal force or of spring pressure and moves through the opening in the rim. Means are provided for limiting outward movement of the indicator member so that it is not thrown out of the assembly but moves outward far enough to be observable from the outside by means of stroboscopic light or otherwise. In this way, blowing of a fuse can be detected even though the fuse itself is mounted in a position where it is not visible.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
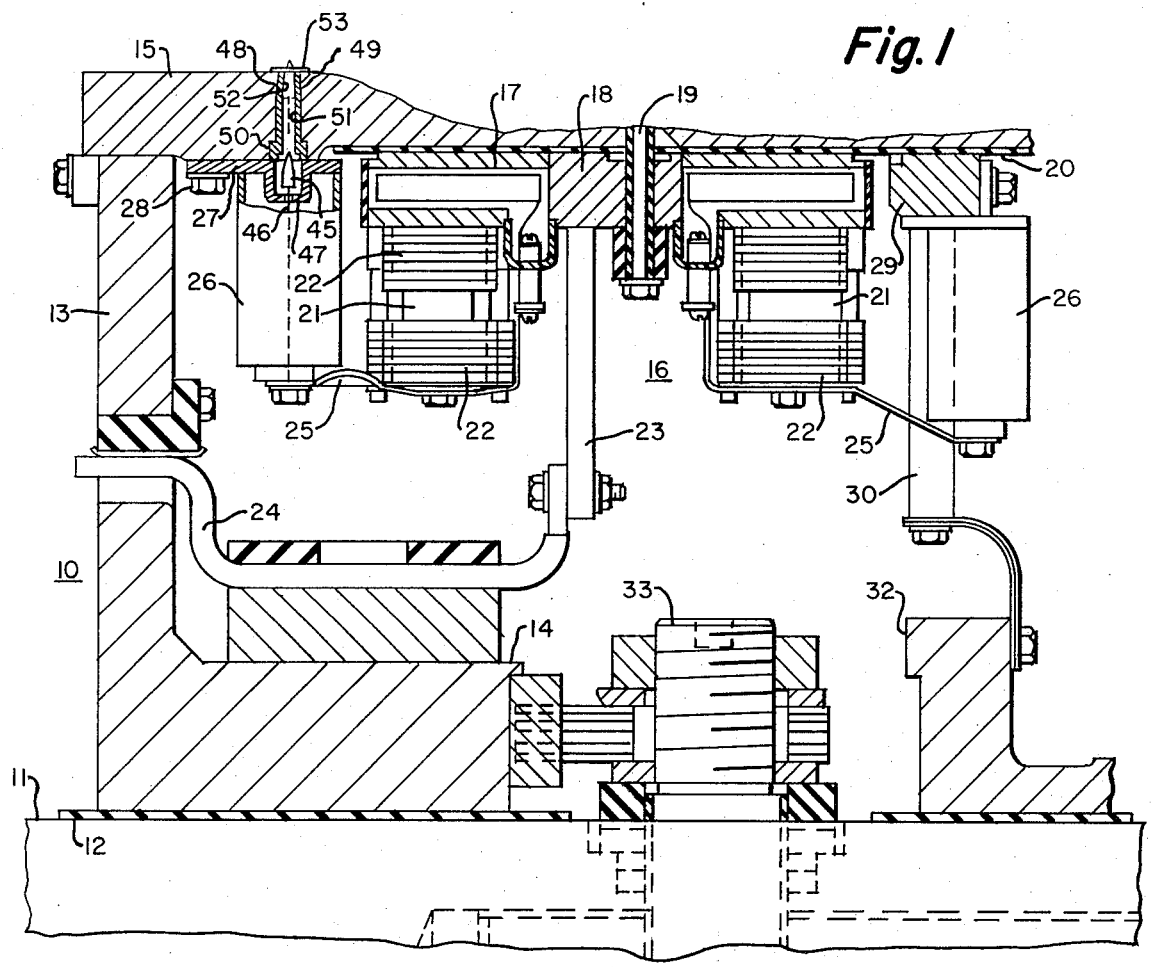
FIG. 1 is a partial longitudinal sectional view of a rotating rectifier assembly embodying the fuse indicator of the invention.

A blown fuse indicator embodying the invention is shown in FIG. 1 in connection with a modular rectifier assembly for a brushless excitation system of the construction shown in the above-mentioned copending application. As shown in FIG. 1, the rectifier assembly is mounted on a support wheel 10 which is carried on a shaft 11 and insulated from the shaft as indicated at 12. The wheel 10 consists of a radial flange portion 13 having a hub portion 14 engaging the shaft and a rim portion 15. The rim portion 15 is generally cylindrical and extends axially from the flange 13. The elements of the wheel 10 are made sufficiently heavy to have the necessary mechanical strength for high speed rotation and to have substantial electrical current carrying capacity as the wheel itself is a part of the rectifier circuit.

A plurality of rectifier modules is mounted on the interior cylindrical surface of the rim 15. Each rectifying module, generally designated 16, has a conductive base member 17 which includes a central terminal portion 18 and which is secured to the rim 15 by a bolt 19 or in any other suitable manner and insulated from the rim by a layer of insulation 20. Two diode assemblies are mounted on the base 17 each consisting of a rectifier diode 21 held between two finned heat sinks 22 by spring pressure. The diode assemblies are mounted on the base 17 so as to be of opposite polarity with respect to the base and they are connected by the base 17 and terminal portion 18 to a connector 23. The connector 23 is connected to a lead 24 from an alternating current exciter carried on the shaft 11. The other side of each diode assembly is connected by a strap connector 25 to a fuse 26. The fuse 26 at the inner end of the module, that is, the end adjacent the wheel flange 13, is directly connected to the rim 15 by means of a terminal cap 27 and bolt 28 so as to be both mechanically and electrically connected to the wheel rim. The fuse 26 at the opposite or outer end of the assembly is insulated from the rim 15, and is attached by means of a conducting segment 29 to a plurality of other fuses for connection through a connector 30 and a collector ring 32 to an output lead which may be carried in a bore of the shaft 11 in the usual manner. The fuse 26 at the inner end of the module is connected through the wheel rim 15 and wheel flange 13 to a radial stud 33 for connection to the other output lead in the shaft 11.

Figure 2:
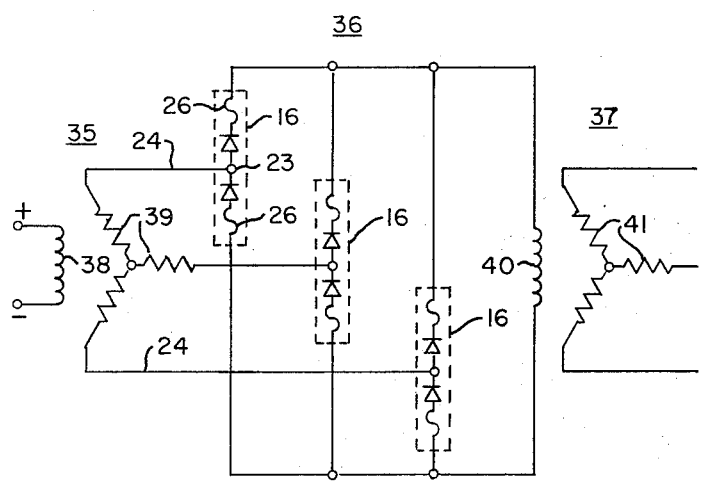
FIG. 2 is a simplified schematic diagram showing a typical brushless exciter system.

As more fully explained in the copending application mentioned above, this construction provides a simple and compact means for obtaining a brushless excitation system. As shown in FIG. 2, the system includes an alternating current exciter 35 and a rotating rectifier assembly 36 supplying field excitation to a main alternating current generator 37. The alternating current exciter 35 has a stationary field structure carrying a field winding 38 excited with direct current from any suitable source, and has a rotating armature carrying a three-phase winding 39, although any suitable winding configuration could be utilized. The rotating rectifier assembly 36 is connected to the exciter armature winding 39 and supplies direct current field excitation to the field winding 40 of the main generator 37. The generator 37 has an armature winding 41 on its stator, and the exciter armature 39, the rotating rectifier assembly 36 and the generator field winding 40 all rotate together on a common shaft.

In the simplified circuit of FIG. 2, the rectifier circuit is made up of one rectifier module 16 for each phase of the exciter armature winding 39. As shown, each phase lead 24 of the exciter is connected to the terminal 23 of a corresponding rectifier module 16 and the fuses 26 of the respective modules, which also constitute terminals, are connected to the output leads carried within the shaft as previously described. It will be seen that a complete three-phase rectifier bridge circuit is provided in this way, each module 16 being capable of forming one branch of such a bridge circuit. It will be understood, of course, that in most cases it will be necessary to provide a number of modules 16 in parallel in each branch of the bridge circuit, and any necessary or desired number of leads can be brought from the exciter armature winding along the shaft and connected to the several modules as required by the particular circuit configuration used and by the current capacity required.

Referring now to FIG. 1, it will be seen that the fuse 26 at the inner or left-hand end of the module 16 is not visible from the outside of the assembly. As previously discussed, it is necessary to provide means for observing the presence of a blown fuse which is observable during operation of the assembly. As shown in FIG. 1, this is accomplished by providing a fuse indicator member or projectile 45 disposed in the upper end of the fuse and normally held in position by any suitable means such as a steel wire 46. The fuse 26 itself may be of any suitable construction which is capable of operating during high speed rotation of the assembly, and has not been shown in detail since such fuses are available and are not a part of the present invention. The terminal cap 27 of the fuse preferably has a recess 47 provided in it in which the indicator member 45 is received and held during normal operation. The retaining wire 46 extends through an opening at the bottom of the recess 47 and is arranged to hold the indicator member 45 in position but to release it in case the fuse blows. This may be done in any well-known manner, such as by connecting the wire 46 electrically in parallel with the fuse element so that when the fuse element blows, the current will transfer to the wire 46 and immediately melt the wire or otherwise cause it to rupture.

An opening 48 is provided extending radially through the rim 15 generally in alignment with the fuse 26 and in position to receive the indicator member 45. The opening 48 also includes means for limiting outward movement of the indicator member 45 and for this purpose, as shown in FIG. 1, an insert 49 is provided in the opening 48. The insert may be made of plastic, or other suitable material such as aluminum or steel, and preferably has a shoulder 50 to retain it in position in the opening 48. The insert 49 has a central bore 51 therethrough and is tapered at its outer end as shown at 52, so that the diameter of the opening 51 at its radially outer end is less than the diameter of the remainder of the opening. The indicator member 45 has a tapered or pointed end conforming generally to the configuration of the reduced portion 52 of the opening 51. A membrane or closure 53 is preferably placed over the open end of the insert 49. The membrane 53 may be made of a suitable plastic film which can readily be ruptured by the indicator member 45 when it moves outwardly.

In operation, the indicator member 45 is normally held in the position shown in FIG. 1 by the wire 46. If the fuse 26 should blow during operation while the assembly is rotating at high speed, the retaining wire 46 will rupture as described above to release the indicator member 45. The high centrifugal force to which the indicator 45 is subjected causes it to be driven radially outward through the opening 51, puncturing the membrane 53 and extending out of the radially outer end of the opening as far as is permitted by the taper 52 of the opening and the corresponding formation of the outer end of the indicator 45. Thus, the projectile or indicator is readily visible from the outside and can be observed even during high speed rotation by means of stroboscopic light, or any other suitable means.

A simple and reliable indicator means is thus provided which will indicate when the fuse 26 blows even though the fuse itself is mounted in a position where it is not visible. The arrangement is such that the indicator is positively moved to a position where it can be seen but is prevented from being thrown out of the assembly as a projectile, which could be hazardous because of the high rotational speed. The membrane 53 is a desirable feature which serves several purposes. It keeps dirt and oil out of the opening 51 of an unblown fuse so that it does not become clogged, which might prevent reliable operation. The membrane is easily punctured by the indicator member, however, and will tend to hold an indicator that has operated in its outermost position even when the assembly has been stopped, so that the indication is retained. If the indicator should fall back, however, when the assembly is stopped, the perforation in the membrane will still show that operation of the indicator has occurred, and even though the indicator itself is not visible, the desired indication of a blown fuse is still obtained.

Figure 3:
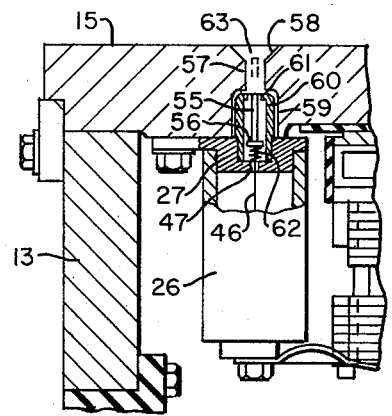
FIG. 3 is a fragmentary view similar to FIG. 1 showing another embodiment of the invention.

A modified embodiment of the invention is shown in FIG. 3. The fuse 26 itself may be the same as described above in connected with FIG. 1, and is mounted in the same manner, but the indicator member utilized here is a cylindrical rod 55 which has a shoulder or flange 56 at the lower end. An opening 57 extends radially through the rim 15 and has a counterbored or chamfered upper end as indicated at 58. The opening 57 is of enlarged diameter at its inner end 59 and a housing 60 which may be of metal, plastic or other suitable material, is threaded into the recess 47 of the terminal cap 27 and is received in the enlarged portion 59. The housing 60 has a flanged upper end 61 with a central opening through which the indicator 55 passes. A compression spring 62 is disposed in the recess 47 engaging the lower end of the indicator 55 and tending to force it outward. The indicator is normally held against movement by the restraining wire 46.

In normal operation, the indicator 55 is held in the position shown in FIG. 3 by the restraining wire 46, compressing the spring 62. If the fuse should blow, the wire 46 is ruptured as described above and the centrifugal force, or the spring 62, or their combined effects drives the indicator 55 radially outward. Movement of the indicator 55 is limited by engagement of the flange 56 with the flanged opening 61 of the housing 60 so that the indicator 55 is positively restrained from moving beyond a desired position which may, for example, be as shown in dotted outline at 63. In this construction, the indicator does not extend beyond the rim 15 but moves outward to a position where it is clearly visible, the chamfered outer end 58 of the opening enhancing the visibility. The spring 62 is not necessary for driving the indicator out while the assembly is rotating, but it is desirable to hold the indicator in its operated position when the assembly is stopped, so that the indication of the blown fuse can be observed during standstill. In other respects, the operation of the embodiment of FIG. 3 is the same as that described above in connection with FIG. 1.

It should now be apparent that a blown fuse indicator has been provided especially suitable for rotating equipment where the fuse is mounted in a position such that it is not visible from the outside of the assembly. The indicator can be arranged, as in FIG. 1, to be expelled from the fuse itself and positioned by configuration of the opening in the supporting rim on which the fuse is mounted, or as shown in FIG. 3 outward movement of the indicator can be limited to the desired extent by the construction of the fuse itself. It will be apparent that although certain illustrative embodiments have been shown and described, the invention is not so limited but that other embodiments and modifications are possible, and that although the invention has been described with particular reference to a specific rotating rectifier assembly, the usefulness of the invention is not so limited and it is applicable to any desired type of rotating equipment.

What is claimed is:

1. In a rotating rectifier assembly including a rotatable support wheel having a plurality of rectifier circuit components mounted on a cylindrical rim thereof, a fuse mounted on the inner surface of said rim, the rim having an opening therethrough in alignment with the fuse, an indicator member disposed at one end of the fuse adjacent said opening, means for normally retaining said indicator member in position and for releasing the indicator member upon blowing of the fuse to permit the indicator member to move outward into the opening, and means for engaging the indicator member to limit its outward movement.

2. The combination defined in claim 1 in which said last-mentioned means comprises a metal wire attached to the indicator member and adapted to be ruptured upon blowing of the fuse.

3. The combination defined in claim 1 in which the outer end of the opening is of reduced diameter relative to the remainder of the opening and the indicator member is shaped to engage said reduced diameter end of the opening.

4. The combination of claim 3 and including a membrane covering the outer end of the opening and adapted to be punctured by the indicator member.

5. The combination of claim 1 in which the fuse includes a housing portion extending into said opening, the indicator member being disposed in said housing, the housing having an open end to permit outward movement of the indicator member therethrough, and the housing and indicator member having interengaging portions to limit outward movement of the indicator member.

6. The combination of claim 5 and including spring means in the housing biasing the indicator member in the outward direction.

\* \* \* \* \*